US012367514B2

(12) United States Patent
Tsutsumi et al.

(10) Patent No.: US 12,367,514 B2
(45) Date of Patent: Jul. 22, 2025

(54) TAXI VEHICLE MANAGEMENT METHOD AND TAXI VEHICLE MANAGEMENT SYSTEM

(71) Applicant: TOYOTA JIDOSHA KABUSHIKI KAISHA, Toyota (JP)

(72) Inventors: Daisuke Tsutsumi, Nagoya (JP); Makoto Kakuchi, Toyota (JP); Yurika Tanaka, Yokosuka (JP); Kazuya Tsuchiya, Toyota (JP); Hiroaki Sugiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/466,559

(22) Filed: Sep. 13, 2023

(65) Prior Publication Data

US 2024/0086981 A1 Mar. 14, 2024

(30) Foreign Application Priority Data

Sep. 14, 2022 (JP) .................................. 2022-146473

(51) Int. Cl.
*G06Q 10/02* (2012.01)
*G06Q 30/0283* (2023.01)
*G06Q 50/40* (2024.01)

(52) U.S. Cl.
CPC ......... *G06Q 30/0284* (2013.01); *G06Q 10/02* (2013.01); *G06Q 50/40* (2024.01)

(58) Field of Classification Search
CPC ............... G06Q 30/02; G06Q 30/0283; G06Q 30/0284; G06Q 30/0207; G06Q 30/0213;
(Continued)

(56) References Cited

U.S. PATENT DOCUMENTS

2015/0283912 A1* 10/2015 Shimizu .................. B60L 55/00
320/157
2016/0307288 A1* 10/2016 Yehuda .................... G06F 16/29
(Continued)

FOREIGN PATENT DOCUMENTS

JP          2004-295521 A      10/2004
JP          2022-123514 A       8/2022

OTHER PUBLICATIONS

White, Important Factors for Early Market Microgrids: Demand Response and Plug-in Electric Vehicle Charging, ProQuest Dissertations and Theses (Year: 2016).*

*Primary Examiner* — Jeff Zimmerman
*Assistant Examiner* — Mark C Clare
(74) *Attorney, Agent, or Firm* — Finnegan, Henderson, Farabow, Garrett, and Dunner, LLP

(57) ABSTRACT

A taxi vehicle management method includes: evaluating, based on DR contribution history information, a degree of contribution to demand response for energy management by a driver of a taxi vehicle, the DR contribution history information indicating a history of contribution to the DR by the driver using a power storage device of the taxi vehicle; and determining a calculation formula of a fare of the taxi vehicle driven by the driver, using a result of evaluation of the degree of contribution by the driver. The determining the calculation formula of the fare includes determining the calculation formula of the fare such that the fare becomes lower as the degree of contribution to the DR by the driver becomes higher.

13 Claims, 7 Drawing Sheets

(58) Field of Classification Search
CPC .... G06Q 30/04; G06Q 30/0645; G06Q 10/02; G06Q 10/06311; G06Q 10/0639; G06Q 50/40; G06Q 50/43; G06Q 50/47
USPC ........................................................ 705/400
See application file for complete search history.

(56) References Cited

U.S. PATENT DOCUMENTS

| | | | |
|---|---|---|---|
| 2019/0139106 A1* | 5/2019 | Onodera | G06Q 30/0278 |
| 2019/0228663 A1* | 7/2019 | Meyers | G08G 1/202 |
| 2021/0339650 A1* | 11/2021 | Hashimoto | B60L 50/60 |
| 2022/0261836 A1 | 8/2022 | Kinomura et al. | |
| 2023/0245223 A1* | 8/2023 | Okai | G06Q 30/0261 |
| | | | 705/307 |

\* cited by examiner

TAXI VEHICLE MANAGEMENT METHOD AND TAXI VEHICLE MANAGEMENT SYSTEM

CROSS REFERENCE TO RELATED APPLICATIONS

This nonprovisional application is based on Japanese Patent Application No. 2022-146473 filed on Sep. 14, 2022 with the Japan Patent Office, the entire contents of which are hereby incorporated by reference.

BACKGROUND

Field

The present disclosure relates to a taxi vehicle management method and a taxi vehicle management system.

Description of the Background Art

Japanese Patent Laying-Open No. 2004-295521 discloses the technique of evaluating a driver of a taxi vehicle (hereinafter, also referred to as "taxi driver") based on a driving situation (e.g., whether the taxi driver does not drive recklessly), a traveling route (e.g., whether the taxi driver does not make a detour longer than an average traveling route), and an impression in customer service.

SUMMARY

As a method for energy management, demand response (DR) is attracting attention. For example, a manager of an external power supply (e.g., an electric utility) may request a manager of a power storage device to perform energy management of the external power supply through the DR. Examples of the energy management of the external power supply include power adjustment (adjustment of a supply and demand balance, a frequency and the like) of a power grid.

In recent years, from the perspective of environmental preservation and the like, an electrically powered vehicle (xEV) (e.g., an electric vehicle referred to as "BEV") including a power storage device tends to become widespread. In the future, it may become commonplace to use such xEV as a taxi vehicle. A driver of a taxi vehicle including a power storage device can perform energy management by using the power storage device.

However, unlike a general home-use personally owned vehicle (POV), a taxi vehicle is used for business (passenger transport). Basically, a driver of a taxi vehicle gives a high priority to business, and thus, it is likely that the driver of the taxi vehicle does not respond to DR even when the driver of the taxi vehicle receives a request for the DR. Therefore, as for a taxi vehicle, there may arise a problem of the difficulty in enhancing a degree of contribution to DR. In addition, it is not preferable that a plurality of taxi vehicles managed by a manager include taxi vehicles that mainly do business (carrying passengers) and taxi vehicles that mainly perform energy management in accordance with DR, because this makes the taxi vehicle management difficult.

The present disclosure has been made to solve the above-described problem, and an object thereof is to suppress a decrease in business performance of a driver of a taxi vehicle participating in demand response (DR), while promoting participation in the DR by the driver of the taxi vehicle.

According to an embodiment of a first aspect of the present disclosure, a taxi vehicle management method described below is provided.

(Clause 1) The taxi vehicle management method includes: evaluating, based on DR contribution history information, a degree of contribution to a demand response for energy management by a driver of a taxi vehicle, the DR contribution history information indicating a history of contribution to the demand response by the driver using a power storage device of the taxi vehicle; and determining a calculation formula of a fare of the taxi vehicle driven by the driver, using a result of evaluation of the degree of contribution by the driver. The determining the calculation formula of the fare includes determining the calculation formula of the fare such that the fare becomes lower as the degree of contribution to the demand response by the driver becomes higher.

According to the above-described method, the fare of the taxi vehicle becomes lower as the degree of contribution to the demand response (DR) by the taxi driver (driver of the taxi vehicle) becomes higher. Therefore, a taxi vehicle driven by a driver having a higher degree of contribution to DR is more likely to be selected by a user (passenger) and is more likely to increase business performance. This offers an incentive for the taxi driver to participate in the DR. As described above, according to the above-described method, it is possible to suppress a decrease in business performance of a taxi driver participating in DR, while promoting participation in the DR by the taxi driver.

The taxi vehicle management method described in clause 1 above may have the following configuration described in any one of clauses 2 to 4.

(Clause 2) The taxi vehicle management method described in clause 1 further includes causing the taxi vehicle to calculate the fare in accordance with the determined calculation formula of the fare.

According to the above-described method, in the taxi vehicle, the fare is calculated in accordance with the calculation formula determined based on the degree of contribution to the DR by the driver of the taxi vehicle. As a result, a system in which the degree of contribution to the DR by the driver and the fare of the taxi vehicle are associated with each other is suitably constructed.

(Clause 3) The taxi vehicle management method described in clause 1 or 2 further includes causing a user terminal used by a user of the taxi vehicle to show information indicating the result of evaluation for the driver.

According to the above-described method, the user can select the taxi vehicle to use, in consideration of the result of evaluation for the driver. In addition, according to the above-described method, the degree of contribution to the DR by the driver and the fare of the taxi vehicle are associated with each other, and thus, a taxi vehicle driven by a driver having a higher degree of contribution to DR is more likely to be selected.

(Clause 4) The taxi vehicle management method described in any one of clauses 1 to 3 further includes the following features. The DR contribution history information indicates at least one of an amount of power of charging or discharging performed by the taxi vehicle in accordance with the demand response (hereinafter, also referred to as "DR actual value"), a time period of the energy management performed by the taxi vehicle in accordance with the demand response (hereinafter, also referred to as "DR participation time period"), and the number of times of participation in the demand response by the taxi vehicle (hereinafter, also referred to as "number of times of DR participation").

According to the above-described method, appropriate evaluation of the degree of contribution to the DR becomes easier. Specifically, the degree of contribution to the DR becomes higher as the DR actual value becomes larger, the DR participation time period becomes longer, and the number of times of DR participation becomes larger.

According to an embodiment, a program that causes a computer to perform the method described in any one of clauses 1 to 4 is provided. According to another embodiment, a computer device that delivers the program is provided.

According to an embodiment of a second aspect of the present disclosure, a taxi vehicle management system described below is provided.

(Clause 5) The taxi vehicle management system includes: a computer device; a plurality of taxi vehicles; and a user terminal. The computer device includes a processor and a storage device having stored thereon a program that causes the processor to perform the taxi vehicle management method described in any one of clauses 1 to 4. Each of the plurality of taxi vehicles includes a power storage device. The computer device performs the taxi vehicle management method for each of the plurality of taxi vehicles. The user terminal shows a selection screen on which a user selects a taxi vehicle to use from candidate taxi vehicles. The user terminal obtains, from the computer device, fare information about the calculation formula of the fare determined for a driver of each taxi vehicle included in the candidate taxi vehicles. The selection screen shows the fare information of each taxi vehicle included in the candidate taxi vehicles.

According to the above-described system, the user can select the taxi vehicle to use, in consideration of the result of evaluation for the driver. In addition, according to the above-described system, the degree of contribution to the DR by the driver and the fare of the taxi vehicle are associated with each other, and thus, a taxi vehicle driven by a driver having a higher degree of contribution to DR is more likely to be selected.

(Clause 6) The taxi vehicle management system described in clause 5 further includes the following features. The user terminal transmits a vehicle dispatch request signal to the computer device, the vehicle dispatch request signal including identification information of the taxi vehicle selected by the user on the selection screen, and a boarding position of the user. When the computer device receives the vehicle dispatch request signal, the computer device transmits a request signal to the taxi vehicle identified by the identification information, the request signal being a signal that requests traveling toward the boarding position indicated by the vehicle dispatch request signal. The request signal includes the calculation formula of the fare determined for a driver of the taxi vehicle identified by the identification information.

According to the above-described system, the user can specify the taxi vehicle and the boarding position through the user terminal, and make a request for vehicle dispatch to the computer device. Then, the computer device that has received the request for vehicle dispatch can request the target vehicle (specified taxi vehicle) to travel toward the specified boarding position.

(Clause 7) The taxi vehicle management system described in clause 6 further includes the following features. Each of the plurality of taxi vehicles includes a fare meter that shows a fare of the taxi vehicle. A corresponding taxi vehicle of the plurality of taxi vehicles causes the fare meter to show the fare calculated in accordance with the calculation formula of the fare included in the request signal when the corresponding taxi vehicle receives the request signal.

According to the above-described system, the calculation formula of the fare is determined based on the degree of contribution to the DR by the driver of the taxi vehicle. In the taxi vehicle, the fare calculated in accordance with the calculation formula is shown on the fare meter. As a result, in the system in which the degree of contribution to the DR by the driver and the fare of the taxi vehicle are associated with each other, it becomes easier for the taxi vehicle to do business.

The computer device may belong to a vehicle dispatch manager (e.g., a taxi company) that manages the plurality of taxi vehicles. In addition, each taxi vehicle may be an electrically powered vehicle (xEV) that is powered entirely or partially by electric power. Examples of the xEV include a battery electric vehicle (BEV), a plug-in hybrid electric vehicle (PHEV), a range extender EV, and a fuel cell electric vehicle (FCEV).

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
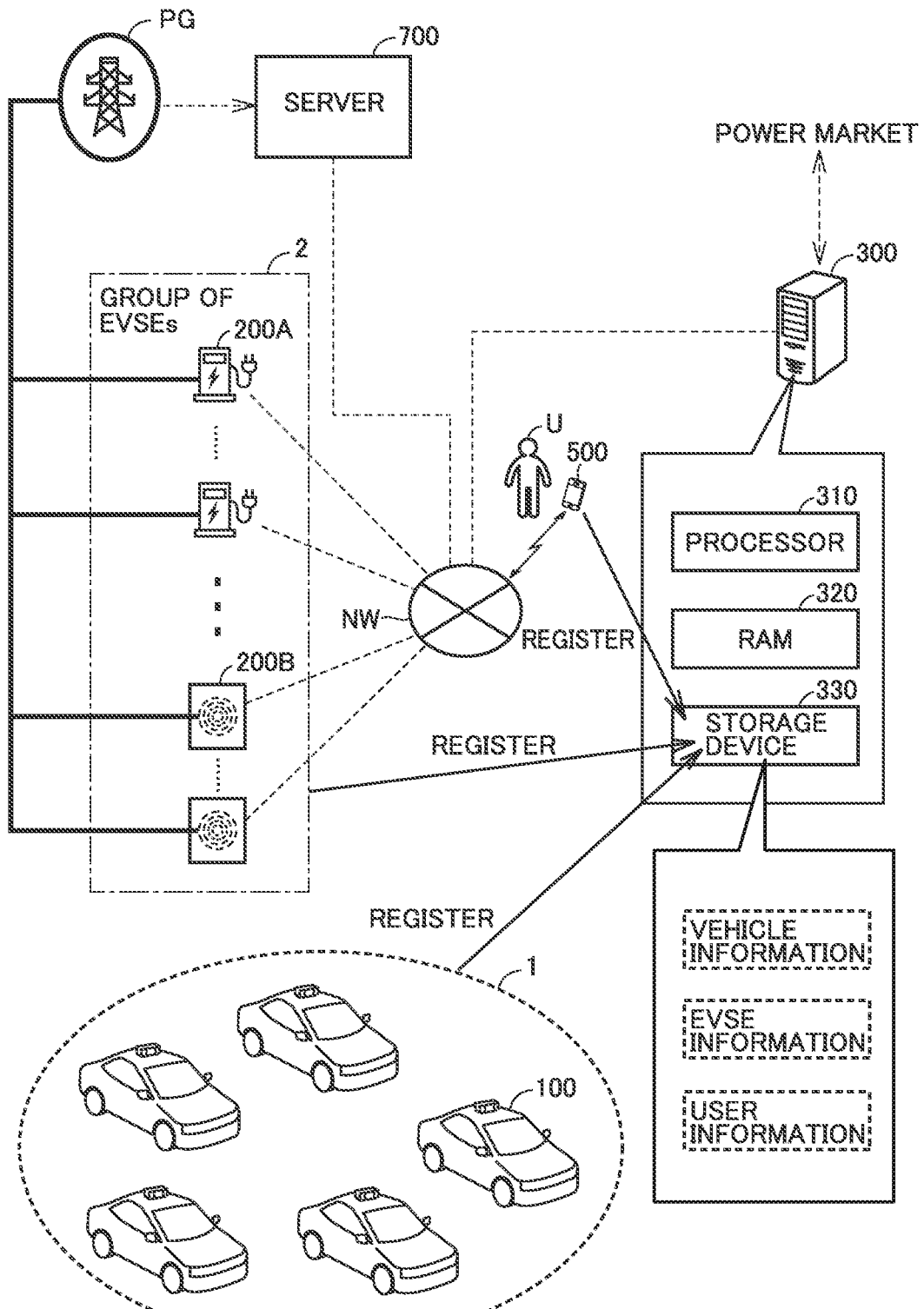
FIG. 1 shows a schematic configuration of a taxi vehicle management system according to an embodiment of the present disclosure.

An embodiment of the present disclosure will be described in detail with reference to the drawings, in which the same or corresponding portions are denoted by the same reference characters and description thereof will not be repeated.

FIG. 1 shows a schematic configuration of a taxi vehicle management system according to an embodiment of the present disclosure. Referring to FIG. 1, the taxi vehicle management system according to the present embodiment includes a group of vehicles 1, a group of EVSEs 2, servers 300 and 700, and a mobile terminal 500. The EVSE refers to electric vehicle supply equipment.

A power grid PG is a power system constructed by power transmission and distribution facilities. A plurality of power plants are connected to power grid PG. Power grid PG is supplied with electric power from these power plants. Server 700 corresponds to a computer that belongs to a transmission system operator (TSO) of power grid PG. Server 300 corresponds to a computer that belongs to a vehicle dispatch manager. In the present embodiment, the vehicle dispatch manager serves as an aggregator. The aggregator is an electric utility that bundles a plurality of distributed energy resources (hereinafter, also referred to as "DERs") to provide an energy management service. A taxi vehicle including a power storage device can function as a DER. Each of server 300 and server 700 is, for example, connected to a communication network NW through a communication line. Communication network NW is, for example, a wide area network constructed by the Internet and a wireless base station. Communication network NW may include a mobile phone network. Server 300 and server 700 are configured to be communicable with each other.

The group of vehicles 1 includes a plurality of taxi vehicles that can operate as adjustment capability of power grid PG. The taxi vehicle is a vehicle that transports passengers. A configuration of the taxi vehicle will be described below (see FIG. 2). The group of EVSEs 2 includes a plurality of EVSEs supplied with electric power from power grid PG. In addition, each EVSE included in the group of EVSEs 2 is electrically connected to power grid PG. Each EVSE included in the group of EVSEs 2 is, for example, connected to communication network NW through a communication line. The group of EVSEs 2 includes an EVSE 200A and an EVSE 200B. EVSE 200A is a wired-type power feeding facility including a power cable. EVSE 200B is, for example, a wireless-type power feeding facility including a wireless power transmission and reception circuit (including a power transmission and reception coil) placed on a road. A method for using each of EVSEs 200A and 200B will be described below.

Server 300 includes a processor 310, a random access memory (RAM) 320 and a storage device 330. Server 300 has a clock function. Server 300 may further include a not-shown human machine interface (HMI). The HMI may be a touch panel display. A central processing unit (CPU) can, for example, be used as processor 310. Storage device 330 is configured to be capable of saving stored information. Storage device 330 may include a rewritable non-volatile memory. Storage device 330 stores programs, and in addition, information used in the programs (e.g., mathematical expressions and various parameters). When processor 310 executes the programs stored in storage device 330, various types of processes (see, for example, FIGS. 3 and 4 described below) are performed. However, these processes can be performed by not only software but also dedicated hardware (electronic circuit).

Identification information of each taxi vehicle (hereinafter, referred to as "taxi vehicle 100" when the taxi vehicles are not distinguished from each other) included in the group of vehicles 1 (vehicle ID) is preliminarily registered with server 300. Storage device 330 of server 300 stores information about taxi vehicle 100 (hereinafter, also simply referred to as "vehicle information") distinguished based on the vehicle ID. The vehicle information includes specifications (e.g., specifications indicating charging performance and discharging performance) of taxi vehicle 100, a state (e.g., DR state/occupied state/vacant state as described below) of taxi vehicle 100, a position of taxi vehicle 100, and a communication address of taxi vehicle 100. Taxi vehicle 100 sequentially transmits the position of taxi vehicle 100 to server 300 by wireless communication. Server 300 updates the vehicle information based on information (latest information) from taxi vehicle 100.

Identification information of each EVSE (hereinafter, referred to as "EVSE 200" when the EVSEs are not distinguished from each other) included in the group of EVSEs 2 (EVSE-ID) is preliminarily registered with server 300. Storage device 330 of server 300 stores information about EVSE 200 (hereinafter, also simply referred to as "EVSE information") distinguished based on the EVSE-ID. The EVSE information includes specifications (e.g., specifications indicating power feeding performance) of EVSE 200, a communication address of EVSE 200, and a position (e.g., a latitude and a longitude) of EVSE 200.

Mobile terminal 500 is a user terminal used by a user U of the taxi vehicle and is configured to be portable. Mobile terminal 500 is carried and operated by user U. In the present embodiment, a smartphone including a touch panel display and a camera is used as mobile terminal 500. The smartphone has built therein a computer including a processor and a storage device. When the processor executes programs stored in the storage device, various types of processes (see, for example, FIG. 4 described below) are performed. However, the present disclosure is not limited to the foregoing. Any mobile terminal can be used as mobile terminal 500. For example, a laptop, a tablet terminal, a portable game console, a wearable device (such as a smart watch, a smart glass or a smart glove), an electronic key or the like can also be used as mobile terminal 500.

Mobile terminal 500 is configured to access communication network NW by wireless communication and communicate with server 300 through communication network NW. Mobile terminal 500 has installed thereon application software for using a vehicle dispatch service provided by server 300 (hereinafter, referred to as "vehicle dispatch app"). Through the vehicle dispatch app, identification information of mobile terminal 500 (terminal ID) is associated with a communication address of mobile terminal 500 and registered with server 300. Mobile terminal 500 can exchange information with server 300 through the vehicle dispatch app. In addition, server 300 manages information about a plurality of users (hereinafter, also referred to as "user information") distinguished based on the terminal ID. The user information includes vehicle dispatch reservation information (e.g., information included in a vehicle dispatch request signal described below), vehicle dispatch history information (e.g., a service used in the past, a taxi driver designated in the past, and the like), point information (e.g., a point received by the user as a result of the use of the service), and online payment information (bank account information, a payment date, a withdrawal date and the like).

Figure 2:
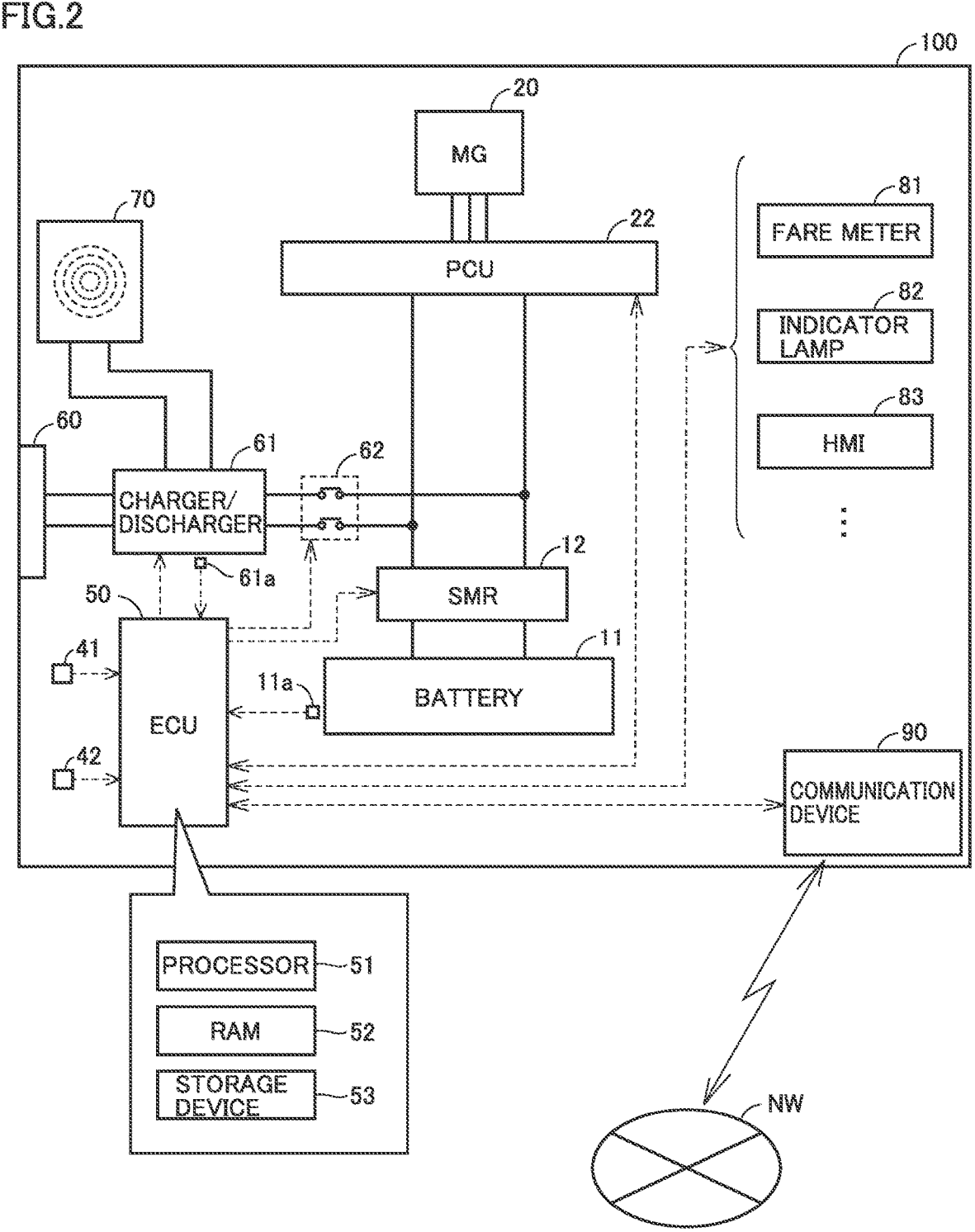
FIG. 2 shows a configuration of a taxi vehicle according to the embodiment of the present disclosure.

FIG. 2 shows a configuration of taxi vehicle 100. Referring to FIG. 2, taxi vehicle 100 further includes a battery 11, a system main relay (SMR) 12, a motor generator (MG) 20, a power control unit (PCU) 22, and an electronic control unit (ECU) 50. ECU 50 includes a processor 51, a random access memory (RAM) 52 and a storage device 53. ECU 50 may be a computer. Storage device 53 is configured to be capable of saving stored information. Storage device 53 stores programs, and in addition, information used in the programs (e.g., maps, mathematical expressions and various parameters). In the present embodiment, when processor 51 executes the programs stored in storage device 53, various types of control (see, for example, FIGS. 3 and 4 described below) in ECU 50 are performed. However, these types of control can be performed by not only software but also dedicated hardware (electronic circuit).

Battery 11 is configured to be chargeable/dischargeable. Taxi vehicle 100 is an electrically powered vehicle (xEV) configured to be capable of traveling using electric power stored in battery 11. Taxi vehicle 100 may be a BEV that does not include an internal combustion engine, or may be a PHEV including an internal combustion engine. A known vehicle power storage device (e.g., a liquid-type secondary battery, an all-solid-state secondary battery or an assembled battery) can be used as battery 11. Examples of the vehicle secondary battery include a lithium ion battery and a nickel-metal hydride battery.

Taxi vehicle 100 further includes a battery management system (BMS) 11a that monitors a state of battery 11. BMS 11a includes various types of sensors that detect the state of battery 11 (e.g., a voltage, a current and a temperature), and outputs a result of detection to ECU 50. In addition to the above-described sensor function, BMS 11a may further have an SOC estimation function and an SOH estimation function. A state of charge (SOC) indicates a remaining amount of stored power and represents, for example, a percentage of a current amount of stored power to an amount of stored power in a fully-charged state in 0 to 100%. A state of health (SOH) indicates a degree of healthiness or a degree of degradation and represents, for example, a percentage of a current capacity to an initial capacity in 0 to 100%.

Taxi vehicle 100 further includes a charger/discharger 61 and a charging/discharging relay 62. Each of charger/discharger 61 and charging/discharging relay 62 is controlled by ECU 50. In the present embodiment, a charging/discharging line including charger/discharger 61 and charging/discharging relay 62 is connected between SMR 12 and PCU 22. However, the present disclosure is not limited to the foregoing. The charging/discharging line may be connected between battery 11 and SMR 12.

Taxi vehicle 100 is configured to be capable of using each of EVSEs 200A and 200B shown in FIG. 1. Taxi vehicle 100 includes an inlet 60 for exchanging electric power with the outside of taxi vehicle 100 through a power cable. Taxi vehicle 100 includes a power transmission and reception circuit 70 (including a power transmission and reception coil) that wirelessly exchanges electric power with the power transmission and reception circuit (including the power transmission and reception coil) of EVSE 200B. Power transmission and reception circuit 70 is, for example, located on an underside (underfloor) of a vehicular body of taxi vehicle 100.

In the present embodiment, charger/discharger 61 and charging/discharging relay 62 are located between inlet 60 and battery 11 and between power transmission and reception circuit 70 and battery 11. Charger/discharger 61 functions as both a charging circuit and a discharging circuit. Charger/discharger 61 charges battery 11 by using electric power input from outside of taxi vehicle 100 to inlet 60 or power transmission and reception circuit 70. Charger/discharger 61 discharges electric power of battery 11 to the outside of taxi vehicle 100 through inlet 60 or power transmission and reception circuit 70. Charger/discharger 61 includes a power conversion circuit. The power conversion circuit includes, for example, a bidirectional converter. The power conversion circuit may perform direct current (DC)/alternating current (AC) conversion bidirectionally. Charging/discharging relay 62 performs switching between connection and disconnection of a power line extending from each of inlet 60 and power transmission and reception circuit 70 to battery 11. Taxi vehicle 100 further includes a monitoring module 61a that monitors a state of charger/discharger 61. Monitoring module 61a includes various types of sensors (e.g., a current sensor and a voltage sensor) that detect the state of charger/discharger 61, and outputs a result of detection to ECU 50. During charging or discharging of battery 11, ECU 50 maintains charging/discharging relay 62 in a connected state (closed state). ECU 50 controls charger/discharger 61 such that charging power or discharging power detected by monitoring module 61a becomes closer to a target value.

When taxi vehicle 100 uses EVSE 200A (FIG. 1), a driver connects a connector of a power cable of EVSE 200A to inlet 60. As a result, taxi vehicle 100 is electrically connected to EVSE 200A through the power cable. In such a state, taxi vehicle 100 can charge battery 11 by using electric power supplied from power grid PG through EVSE 200A to inlet 60, and supply electric power discharged from battery 11 to power grid PG through EVSE 200A.

When taxi vehicle 100 uses EVSE 200B (FIG. 1), the driver performs alignment of power transmission and reception circuit 70 such that the power transmission and reception coil of power transmission and reception circuit 70 is located directly above the power transmission and reception coil of EVSE 200B. The driver may perform alignment of power transmission and reception circuit 70 by driving (manually driving) taxi vehicle 100 by himself/herself, or may perform alignment of power transmission and reception circuit 70 by using the driving assistance function (e.g., the function of self-driving to a target position) of taxi vehicle 100. After the alignment between the power transmission and reception coils is completed, taxi vehicle 100 can charge battery 11 by using electric power supplied from power grid PG through EVSE 200B to power transmission and reception circuit 70, and supply electric power discharged from battery 11 to power grid PG through EVSE 200B.

MG 20 of taxi vehicle 100 is, for example, a three-phase AC motor generator. MG 20 functions as a traveling motor of taxi vehicle 100. PCU 22 includes a circuit that drives MG 20 by using electric power supplied from battery 11. PCU 22 includes, for example, an inverter and a converter. MG 20 is driven by PCU 22 and rotates driving wheels of taxi vehicle 100. MG 20 also performs regenerative power generation and outputs generated electric power to battery 11 through PCU 22. SMR 12 performs switching between connection and disconnection of a power line extending from battery 11 to PCU 22. Each of SMR 12 and PCU 22 is controlled by ECU 50. During traveling of taxi vehicle 100, SMR 12 is maintained in a connected state (closed state). SMR 12 is also maintained in the connected state when electric power is exchanged between battery 11 and the outside of taxi vehicle 100. The number of the traveling motors of taxi vehicle 100 is arbitrary, and may be one, two, or three or more. The traveling motor may be an in-wheel motor.

Taxi vehicle 100 further includes a position sensor 41, an occupied-state-traveling measuring instrument 42, a fare meter 81, an indicator lamp 82, an HMI 83, and a communication device 90. Position sensor 41 may be a sensor using the global positioning system (GPS). Taxi vehicle 100 may include a not-shown car navigation system (hereinafter, also referred to as "NAVI system"). Position sensor 41 may be a position sensor used in the NAVI system. Occupied-state-traveling measuring instrument 42 enters an operating state to measure occupied-state-traveling data while taxi vehicle 100 is in the occupied state. Occupied-state-traveling measuring instrument 42 includes a distance measuring instrument that measures an occupied-state-traveling distance, and a time period measuring instrument that measures an occupied-state-traveling time period.

Fare meter 81 is configured to show, in real time, a fare (occupied-state-traveling fee) related to passenger transport by taxi vehicle 100. Fare meter 81 is, for example, a taxi meter subjected to a prescribed inspection. Although a fare calculation method by fare meter 81 is arbitrary, a time and distance combined-use method is used in the present embodiment. That is, fare meter 81 calculates and shows the fare in accordance with the occupied-state-traveling distance and the occupied-state-traveling time period measured by occupied-state-traveling measuring instrument 42, as described below.

In the fare calculation method (time and distance combined-use method) according to the present embodiment, the fare of taxi vehicle 100 (hereinafter, also referred to as "taxi fare") is calculated based on, for example, a starting fare (minimum fare) and an additional fare. A predetermined fare (e.g., a fare determined for each region) is used as the starting fare. However, in the present embodiment, a discount on the starting fare may be received in accordance with a degree of DR contribution by the driver as described below (see S13 in FIG. 4). A distance additional fare and a time additional fare are used as the additional fare. Specifically, during low-speed traveling (e.g., traveling at 10 km/h or less), the additional fare is calculated by adding a prescribed time unit price (e.g., 100 yen) every time taxi vehicle 100 travels in the occupied state for a prescribed unit time (e.g., 90 seconds). In contrast, during normal traveling (i.e., other than the above-described low-speed traveling), the additional fare is calculated by adding a prescribed distance unit price (e.g., 50 yen) every time taxi vehicle 100 travels in the occupied state by a prescribed unit distance (e.g., 100 m). However, in the present embodiment, a discount on the time unit price and the distance unit price may be received in accordance with the degree of DR contribution by the driver as described below (see S13 in FIG. 4). Fare meter 81 calculates the taxi fare by adding the starting fare, the additional fare (distance additional fare) during normal traveling, and the additional fare (time additional fare) during low-speed traveling.

The method for calculating the taxi fare is not limited to the foregoing. For example, the additional fare may be constantly calculated by using a distance-based method (a method for adding a distance unit price every time a taxi vehicle travels in the occupied state by a unit distance) or a time-based method (a method for adding a time unit price every time a unit time elapses during traveling in the occupied state), regardless of the traveling speed.

Indicator lamp 82 is, for example, a super sign. Indicator lamp 82 shows the state of taxi vehicle 100 so as to be visible from the outside. Indicator lamp 82 is, for example, located near a windshield of taxi vehicle 100.

HMI 83 includes an input device and a display device. HMI 83 may include a touch panel display. In the present embodiment, HMI 83 includes a tablet terminal including a touch panel display (see FIGS. 6 and 7). In addition, HMI 83 may include an input device and a display device of the NAVI system. HMI 83 may include a meter panel and/or a head up display. HMI 83 may include an operation unit (input device) provided on a steering wheel. HMI 83 may include a smart speaker that accepts a voice input.

Communication device 90 includes various types of communication interfaces (I/Fs). Through communication device 90, ECU 50 communicates with a device located outside taxi vehicle 100. Communication device 90 includes a communication I/F for accessing communication network NW by wireless communication. Communication device 90 may include a telematics control unit (TCU) and/or a data communication module (DCM) that perform wireless communication. Communication device 90 may further include a communication OF for performing wired communication with EVSE 200. Communication device 90 may further include a communication OF for communicating with mobile terminal 500.

Referring again to FIG. 1, server 300 is configured to bundle a plurality of DERs to implement a virtual power plant (VPP). The VPP is a mechanism for controlling a plurality of DERs remotely and integratedly as if the plurality of DERs functioned as one power plant. For example, taxi vehicle 100 electrically connected to EVSE 200 can function as a DER for the VPP. Therefore, server 300 causes taxi vehicle 100 to perform energy management of power grid PG in response to a request from server 700 (TSO), for example. In addition, server 300 may make a successful bid for the adjustment capability (control reserve) requested by the TSO in the power market. Server 300 may be configured to automatically carry out transactions (e.g., bidding and commitment) in the power market in accordance with a condition (e.g., a bidding condition) predetermined by the user, and manage books (transaction records) about power transactions. Server 300 may make payments about the power transactions. Server 300 performs demand response (DR) for energy management of power grid PG in response to a request. Through the DR, taxi vehicle 100 receives a request for the above-described energy management.

Figure 3:
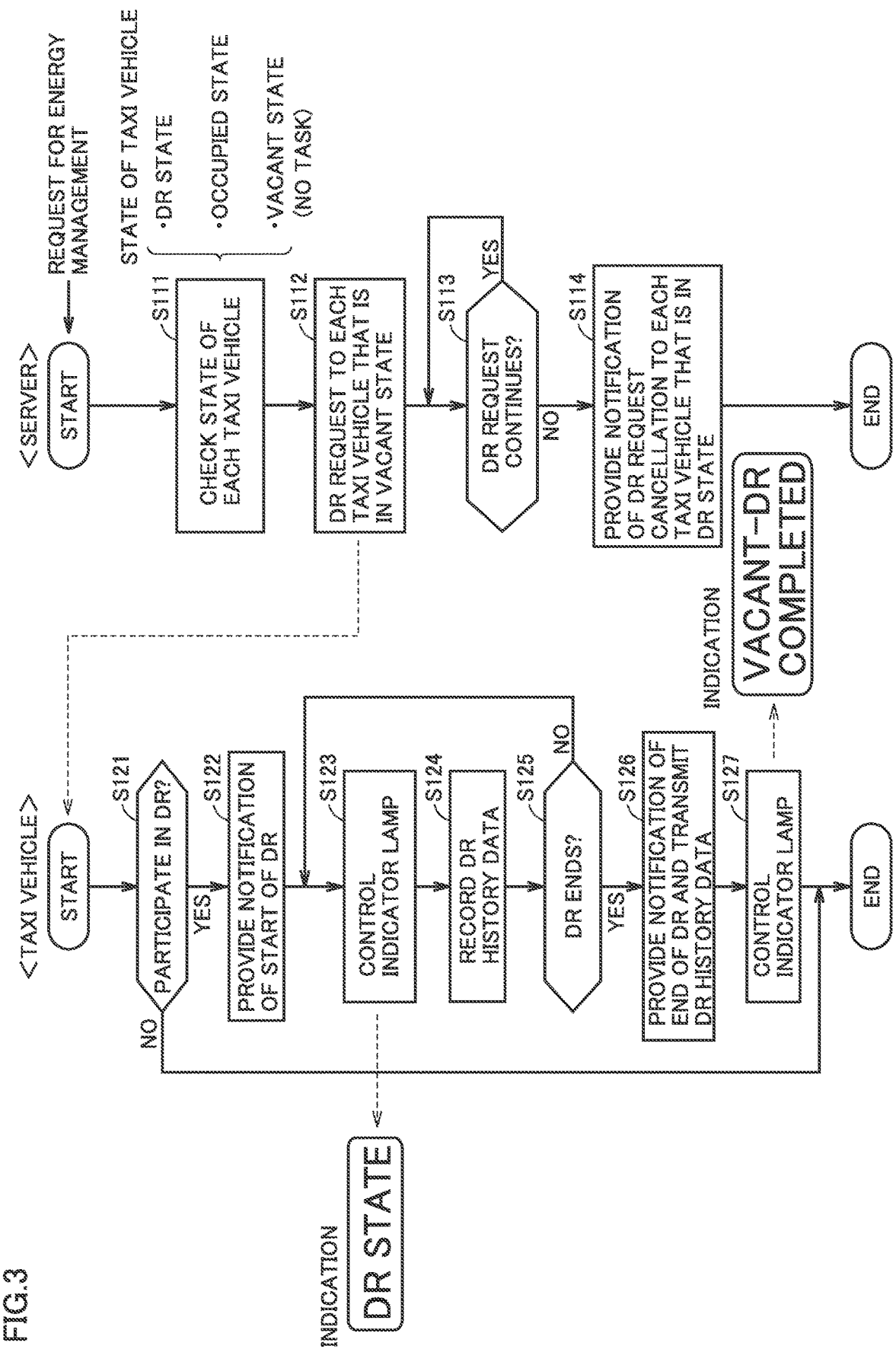
FIG. 3 is a flowchart showing a process related to demand response (DR) in a taxi vehicle management method according to the embodiment of the present disclosure.

FIG. 3 is a flowchart showing a process related to the DR performed by server 300 and taxi vehicle 100. "S" in the flowchart refers to a step. When a request for energy management of power grid PG occurs, server 300 starts a series of steps S111 to S114 described below. The above-described request for energy management to server 300 occurs, for example, when server 700 requests energy management to server 300, or when the start time of energy management (e.g., adjustment capability) bought by server 300 in the power market comes.

Referring to FIG. 3 together with FIGS. 1 and 2, in S111, server 300 checks a state of each taxi vehicle 100 included in the group of vehicles 1. In the present embodiment, server 300 determines whether taxi vehicle 100 is in the DR state (state of participating in the DR), is in the occupied state (state of traveling with passengers on board), or is in the vacant state (state other than the DR state and the occupied state). Server 300 can determine whether taxi vehicle 100 is in the DR state, based on notification of the start of the DR (S122 in FIG. 3) and notification of the end of the DR (S126 in FIG. 3) described below. In addition, server 300 can determine whether taxi vehicle 100 is in the occupied state, based on notification of the start of traveling in the occupied state (S31 in FIG. 4) and notification of the end of traveling in the occupied state (S35 in FIG. 4) described below. The state (DR state/occupied state/vacant state) of each taxi vehicle 100 included in the group of vehicles 1 is stored in storage device 330 and is sequentially updated by processor 310. The vacant state means that there is no task.

Next, in S112, server 300 transmits, to each taxi vehicle 100 that is in the above-described vacant state, a demand response (DR) request signal that requests the energy management of power grid PG. The DR request signal includes contents of the energy management to be requested. The DR request signal according to the present embodiment indicates whether the energy management to be requested is charging or discharging. Thereafter, in S113, server 300 determines whether the request for the energy management of power grid PG to server 300 continues.

While the request for the energy management of power grid PG to server 300 continues, a determination of YES is made in S113 and the DR continues. While the DR continues, the determination in S113 is repeated. On the other hand, when the request for the energy management of power grid PG to server 300 ends, a determination of NO is made in S113 and the process proceeds to S114. The request for the energy management of power grid PG to server 300 ends, for example, when server 700 requests the end of the energy management to server 300, or when the end time of the energy management bought by server 300 in the power market comes.

In S114, server 300 transmits, to each taxi vehicle 100 that is in the DR state, a DR cancelation signal indicating that the request for the DR (S112) has been canceled. As a result, the DR ends. When step S114 is performed, the series of steps S111 to S114 end.

When ECU 50 of each vacant taxi vehicle 100 included in the group of vehicles 1 receives the above-described DR request signal (S112), ECU 50 starts a series of steps S121 to S127 described below. In S121, ECU 50 determines whether to participate in the DR. Specifically, when ECU 50 receives the DR request signal, ECU 50 uses the display device (e.g., the NAVI display or the meter panel) included in HMI 83 to inform the driver about the reception of the request for the DR and the contents (charging or discharging) of the energy management requested by the DR. Using the input device (e.g., the operation unit provided near a driver's seat) included in HMI 83, the driver can provide, to ECU 50, an input of whether to participate in the DR. When ECU 50 receives an input of non-participation in the DR from the driver, a determination of NO is made in S121 and the series of steps S121 to S127 end. On the other hand, when ECU 50 receives an input of participation in the DR from the driver, a determination of YES is made in S121 and the process proceeds to S122.

In S122, ECU 50 provides notification of the start of the DR to server 300. Next, in S123, ECU 50 controls indicator lamp 82 such that indicator lamp 82 shows "DR State". "DR State" means that taxi vehicle 100 is participating in the DR. Next, in S124, ECU 50 records DR history data described below in storage device 53.

Specifically, taxi vehicle 100 participating in the DR is driven by the driver and moves to any EVSE 200 included in the group of EVSEs 2. Then, taxi vehicle 100 performs the energy management of power grid PG by using EVSE 200. More specifically, ECU 50 performs charging or discharging of battery 11 requested by the DR, with power grid PG and battery 11 of taxi vehicle 100 being electrically connected through EVSE 200. The DR history data recorded in S124 includes a DR time period (including the DR start time and the DR end time), transition of a position of taxi vehicle 100 during the DR time period (including a traveling route of taxi vehicle 100 to EVSE 200), and an amount of power charged or discharged in battery 11 during the DR time period (i.e., DR actual value). In the present embodiment, the timing at which the determination of YES is made in S121 corresponds to the DR start time, and the timing at which a determination of YES is made in S125 as described below corresponds to the DR end time.

Next, in S125, ECU 50 determines whether the participation in the DR by taxi vehicle 100 ends. For example, when taxi vehicle 100 receives the above-described DR cancelation signal (S114) from server 300, the determination of YES is made in S125. When the charging or discharging of battery 11 requested by the DR is aborted at the driver's discretion, the determination of YES is also made in S125. When ECU 50 receives an input of leaving from the DR from the driver, ECU 50 stops the above-described charging or discharging.

When the request for the DR is not canceled on the aggregator side (server 300) and when the charging or discharging in accordance with the DR is not stopped on the driver side (taxi vehicle 100), a determination of NO is made in S125 and the participation in the DR by taxi vehicle 100 continues. In this case, the process returns to S123 and S123 to S125 are repeated. On the other hand, when the participation in the DR by taxi vehicle 100 ends (YES in S125), ECU 50 transmits the DR history data recorded in S124 to server 300 in S126. In addition, ECU 50 provides notification of the end of the DR to server 300.

Thereafter, in S127, ECU 50 controls indicator lamp 82 such that indicator lamp 82 shows "Vacant-DR Completed". "Vacant-DR Completed" means that taxi vehicle 100 is in the vacant state (state of not carrying passengers) and taxi vehicle 100 has already participated in the DR in the current evaluation time period (specifically, one day set as an evaluation time period described below). In taxi vehicle 100 that has already participated in the DR in the current evaluation time period, indicator lamp 82 shows "Vacant-DR Completed" in the vacant state. On the other hand, in taxi vehicle 100 that has not yet participated in the DR in the current evaluation time period, indicator lamp 82 shows "Vacant-DR Uncompleted" in the vacant state. "Vacant-DR Uncompleted" means that taxi vehicle 100 is in the vacant state and taxi vehicle 100 has not yet participated in the DR in the current evaluation time period. In the present embodiment, when taxi vehicle 100 leaves the DR in midstream, the participation in the DR by taxi vehicle 100 is also determined and indicator lamp 82 shows "Vacant-DR Completed" (S127). However, the present disclosure is not limited to the foregoing. When taxi vehicle 100 leaves the DR in midstream, the participation in the DR by taxi vehicle 100 may not be determined (e.g., the indication on indicator lamp 82 is maintained in "Vacant-DR Uncompleted" and the number of times of participation in the DR is not incremented). On indicator lamp 82, a distinction between "DR Completed" and "DR Uncompleted" may be made by lighting colors. For example, indicator lamp 82 may show "Vacant" in green instead of "Vacant-DR Completed", and show "Vacant" in red instead of "Vacant-DR Uncompleted".

When step S127 is performed, the series of steps S121 to S127 end. When taxi vehicle 100 provides notification to server 300 (e.g., S122 and S126 in FIG. 3, and S31 and S35 in FIG. 4 described below), taxi vehicle 100 also transmits its own vehicle ID together. This makes it easier for server 300 to appropriately understand the state of each taxi vehicle.

Basically, a driver of a taxi vehicle gives a high priority to business (carrying passengers), and thus, it is likely that the driver of the taxi vehicle does not respond to demand response (DR) even when the driver of the taxi vehicle receives a request for the DR. Therefore, in the present embodiment, server 300 evaluates a degree of DR contribution by the driver (i.e., degree of contribution to the demand response), using the DR history data (S124 and S126 in FIG. 3) received from taxi vehicle 100. Then, server 300 determines a calculation formula of a fare of taxi vehicle 100 driven by the driver, using a result of evaluation of the degree of DR contribution by the driver. At this time, server 300 determines the calculation formula of the taxi fare such that the taxi fare becomes lower as the degree of DR contribution by the driver becomes higher. The above-described DR history data is recorded when taxi vehicle 100 is participating in the DR (S124 in FIG. 3). The DR history data indicates a history of contribution to the DR for the energy management by the driver of taxi vehicle 100 by using battery 11 (power storage device of taxi vehicle 100). The DR history data according to the present embodiment includes an example of "DR contribution history information" according to the present disclosure.

In the taxi vehicle management system according to the present embodiment, the calculation formula of the taxi fare is determined as described above, and thus, a driver having a higher degree of DR contribution is more advantageous in terms of fare and is more likely to increase business performance than a driver having a lower degree of DR contribution. This offers an incentive for the driver of the taxi vehicle to participate in the DR. As described above, according to the above-described system, it is possible to suppress a decrease in business performance of a taxi driver participating in DR, while promoting participation in the DR by the taxi driver.

Figure 4:
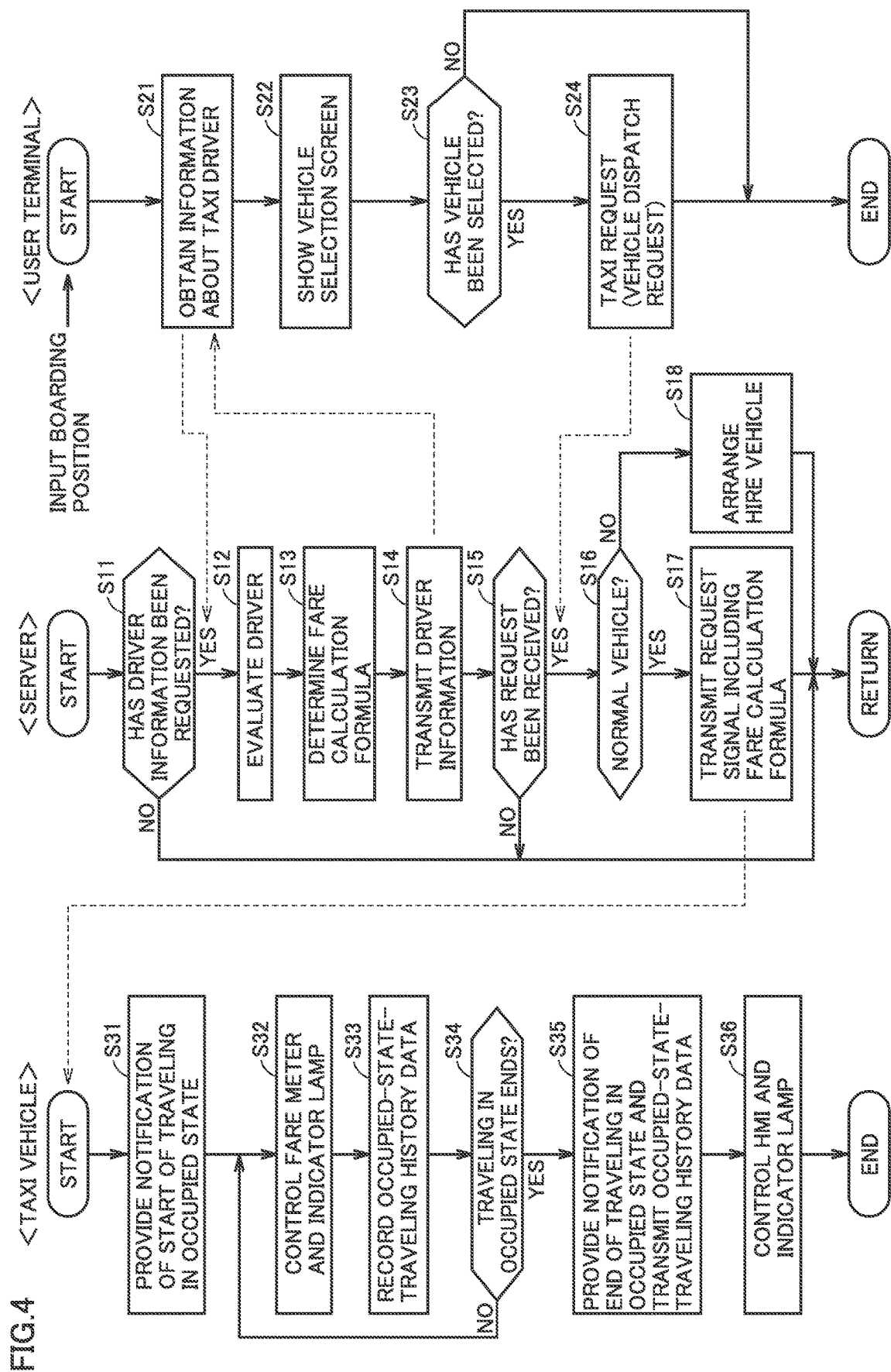
FIG. 4 is a flowchart showing a process related to vehicle dispatch and passenger transport in the taxi vehicle management method according to the embodiment of the present disclosure.

FIG. 4 is a flowchart showing a process related to vehicle dispatch and passenger transport performed by server 300, taxi vehicle 100 and mobile terminal 500 (user terminal). Server 300 repeatedly performs a series of steps S11 to S18 described below.

Referring to FIG. 4 together with FIGS. 1 and 2, in S11, server 300 determines whether information about a taxi driver has been requested from mobile terminal 500 (taxi user). When server 300 receives an information request signal (S21) described below, server 300 makes a determination of YES in S11. On the other hand, when server 300 does not receive the above-described information request signal, server 300 makes a determination of NO in S11. As a result, the series of steps S11 to S18 end and the process returns to the first step (S11). Then, the determination in S11 is repeated until the determination of YES is made in S11.

When user U inputs a boarding position to a vehicle dispatch app launched on mobile terminal 500, mobile terminal 500 starts a series of steps S21 to S24 described below. In S21, mobile terminal 500 transmits the information request signal to server 300. The information request signal requests, to server 300, the information about the driver of each taxi vehicle 100 that is present around the above-described boarding position. The information request signal includes the boarding position input by user U, and a terminal ID of mobile terminal 500.

When server 300 receives the above-described information request signal (YES in S11), server 300 evaluates a degree of DR contribution by the driver of each vacant taxi vehicle 100 that is present around the boarding position (e.g., within a prescribed distance from the boarding position) indicated by the information request signal. Specifically, server 300 evaluates the degree of DR contribution for each taxi driver, based on the DR history data (S124 and S126 in FIG. 3) obtained within the evaluation time period. In the present embodiment, the evaluation time period of the degree of DR contribution is set at one day (24 hours). That is, the degree of DR contribution by the taxi driver is evaluated by using the DR history data indicating the degree of DR contribution in one day. According to such an evaluation method, when the taxi driver receives the request for DR, the taxi driver is likely to participate in the DR more actively every day in order to obtain the fare advantage. However, when the evaluation time periods of all drivers are set at "0:00 to 24:00", the degree of DR contribution is reset immediately (at 24:00) even if contribution is made to DR at night (e.g., DR at around 23:00), and thus, the number of drivers that do not participate in the DR at night is likely to increase. Therefore, the start time and the end time of the evaluation time period may vary for each driver. The end time of the evaluation time period corresponds to the time at which the result of evaluation (DR history data) for the driver is reset (initialized). For example, the start time of the evaluation time period may be shifted by a prescribed time period (e.g., one hour) for each driver, such as by setting the evaluation time period of one driver at "0:00 to 24:00" and the evaluation time period of another driver at "1:00 to 25:00 (1:00 on the next day)".

In the present embodiment, the DR history data includes the DR time period, and the amount of power charged or discharged in battery 11 during the DR time period. A length of the DR time period corresponds to a DR participation time period (i.e., a time period during which taxi vehicle 100 was performing the energy management in accordance with the DR). The number of the DR time periods corresponds to the number of times of participation in the DR (i.e., the number of times of participation in the DR by taxi vehicle 100). The amount of power charged or discharged in battery 11 during the DR time period corresponds to the DR actual value (i.e., the amount of power of charging or discharging performed by taxi vehicle 100 in accordance with the DR). Server 300 evaluates, for each taxi driver, that the degree of DR contribution becomes higher as a total value of the DR actual value in the evaluation time period (hereinafter, referred to as "first evaluation value") becomes larger, a total value of the DR participation time period in the evaluation time period (hereinafter, referred to as "second evaluation value") becomes longer, and a total value of the number of times of participation in the DR in the evaluation time period (hereinafter, referred to as "third evaluation value") becomes larger.

For example, server 300 evaluates, as being high (A), the degree of DR contribution by the driver in which the first evaluation value is equal to or larger than a first reference value, the second evaluation value is equal to or larger than a second reference value, and the third evaluation value is equal to or larger than a third reference value. Server 300 evaluates, as being low (C), the degree of DR contribution by the driver in which the first evaluation value is less than the first reference value, the second evaluation value is less than the second reference value, and the third evaluation value is less than the third reference value. Server 300 evaluates, as being normal (B), the degree of DR contribution by the driver that does not fall under high (A) and low (C).

However, the above-described method for evaluating the degree of DR contribution is merely an example and can be changed as appropriate. For example, the degree of DR contribution may be evaluated on a scale of one to four or more, not on a scale of one to three. Alternatively, the degree of DR contribution may be scored. Although absolute evaluation based on the predetermined criteria is used as the evaluation method in the present embodiment, relative evaluation based on ranking of the taxi drivers may be used. Furthermore, in the present embodiment, the DR history data includes the transition of the position of taxi vehicle 100 during the DR time period. This position information may be used for evaluation of the degree of DR contribution. For example, server 300 may downgrade the degree of DR contribution for the driver of taxi vehicle 100 determined as having traveled without the intention of participating in the DR during the DR time period based on the above-described position information during the DR time period. In addition, the evaluation time period of the degree of DR contribution is not limited to one day and is arbitrary, such as one week or one year.

Next, in S13, based on the result of evaluation in S12, server 300 determines a calculation formula of a fare of each vacant taxi vehicle 100 that is present around the boarding position indicated by the above-described information request signal. At this time, server 300 determines the calculation formula of the fare of each taxi vehicle 100 such that the fare of taxi vehicle 100 driven by the driver becomes lower as the degree of DR contribution by the driver becomes higher.

Specifically, the taxi fare according to the present embodiment is calculated by adding the starting fare, the distance additional fare and the time additional fare as described above. In the calculation formula of such taxi fare, the starting fare, the time unit price and the distance unit price are parameters. In S13, server 300 determines the values of these parameters. In the present embodiment, as to the taxi fare of the driver evaluated as being low (C) in the degree of DR contribution, no discount is offered. Hereinafter, a calculation formula of the taxi fare with no discount will be referred to as "calculation formula C". As to the taxi fare of the driver evaluated as being normal (B) in the degree of DR contribution, server 300 offers a discount on only the starting fare and calculates the additional fare similarly to calculation formula C. Hereinafter, a calculation formula of the taxi fare determined for the driver having the normal degree of DR contribution will be referred to as "calculation formula B". As to the taxi fare of the driver evaluated as being high (A) in the degree of DR contribution, server 300 offers discounts on both the starting fare and the additional fare. Hereinafter, a calculation formula of the taxi fare determined for the driver having the high degree of DR contribution will be referred to as "calculation formula A". For example, the starting fares in calculation formulas C, B and A may be set at 400 yen, 300 yen and 300 yen, respectively. The time unit prices per 90 seconds in calculation formulas C, B and A may be set at 100 yen, 100 yen and 80 yen, respectively. The distance unit prices per 100 meters in calculation formulas C, B and A may be set at 50 yen, 50 yen and 40 yen, respectively.

However, the above-described method for determining the calculation formula of the taxi fare is merely an example and can be changed as appropriate. For example, all of the starting fare, the time unit price and the distance unit price may become lower as the degree of DR contribution by the driver becomes higher.

Next, in S14, server 300 transmits, to mobile terminal 500, a taxi information signal including the identification information (vehicle ID), the position information and the driver information of each vacant taxi vehicle 100 that is present around the boarding position indicated by the above-described information request signal. The position information and the driver information of taxi vehicle 100 are transmitted in association with the corresponding vehicle ID. The transmitted driver information includes the degree of DR contribution (e.g., high/normal/low) evaluated in S12, the parameters (e.g., the starting fare, the time unit price and the distance unit price) of the calculation formula determined in S13, and the discount (e.g., amount of discount of each of the starting fare, the time unit price and the distance unit price) corresponding to the degree of DR contribution.

When mobile terminal 500 receives the above-described taxi information signal (S14), a vehicle selection screen is shown on mobile terminal 500 in S22. The vehicle selection screen corresponds to a screen (selection screen) for selecting taxi vehicle 100 to be used by user U from candidate taxi vehicles.

Figure 5:
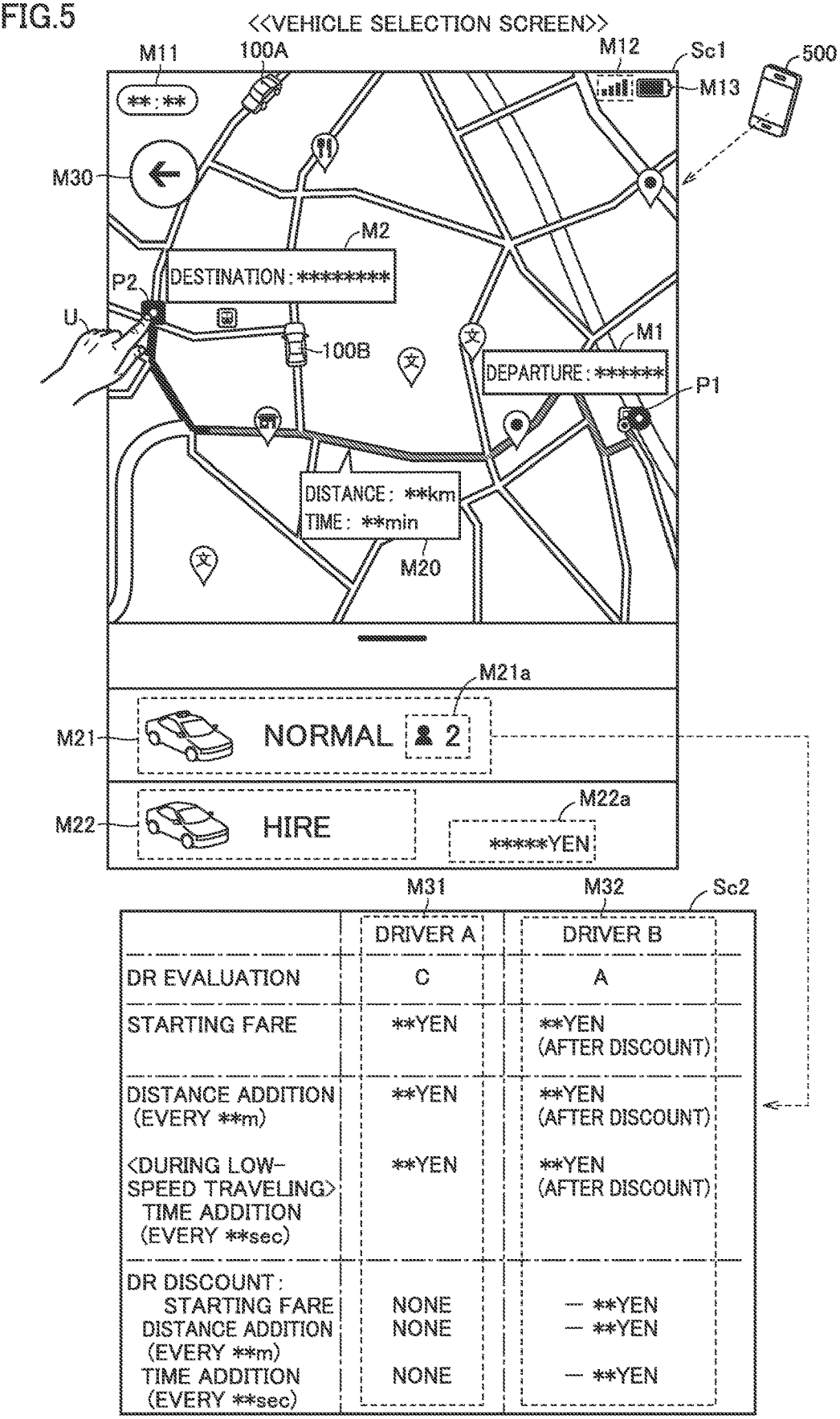
FIG. 5 shows an example of a vehicle selection screen displayed on a user terminal according to the embodiment of the present disclosure.

FIG. 5 shows an example of the vehicle selection screen shown on the touch panel display of mobile terminal 500. Referring to FIG. 5, a vehicle selection screen Sc1 includes information sections M11 to M13. Information section M11 indicates the current time. Information section M12 indicates a communication situation (e.g., radio wave intensity) of mobile terminal 500. Information section M13 indicates a remaining battery power of mobile terminal 500.

Vehicle selection screen Sc1 shows a map around a boarding position P1 input by user U, and shows a position of taxi vehicle 100A, a position of taxi vehicle 100B, and boarding position P1 on the map. Each of taxi vehicles 100A and 100B corresponds to vacant taxi vehicle 100 that is present around boarding position P1. Vehicle selection screen Sc1 further shows an information section M1 that indicates a name (e.g., place name or landmark name) of boarding position P1. With the above-described map being shown, mobile terminal 500 accepts an input of a destination from user U. User U can input the destination to mobile terminal 500 by touching a portion corresponding to the destination on the map shown on vehicle selection screen Sc1. When user U inputs the destination to mobile terminal 500, vehicle selection screen Sc1 shows a position P2 of the destination on the above-described map, and vehicle selection screen Sc1 further shows an information section M2 that indicates a name (e.g., place name or landmark name) of the destination. Then, mobile terminal 500 performs a route search and shows a traveling route from boarding position P1 to the destination (position P2). Furthermore, mobile terminal 500 shows an information section M20 that indicates approximate values of an occupied-state-traveling distance and an occupied-state-traveling time period about the traveling route.

Vehicle selection screen Sc1 further includes an operation section M30. When operation section M30 is operated by user U, mobile terminal 500 cancels the contents (boarding position and destination) input from user U, and shows a boarding position input screen (not shown) that accepts an input of the boarding position from user U, instead of vehicle selection screen Sc1.

Vehicle selection screen Sc1 further includes operation sections M21 and M22, and information sections M21a and M22a. Operation section M21 is an operation section that enables user U to select a taxi vehicle of normal type. Information section M21a shows the number (in the example shown in FIG. 5, two) of the vacant taxi vehicles of normal type that are present around boarding position P1. When operation section M21 is operated, mobile terminal 500 shows a driver information screen Sc2 instead of or in addition to vehicle selection screen Sc1. Driver information screen Sc2 shows the driver information (S14) received from server 300.

Specifically, driver information screen Sc2 shows the evaluated degree of DR contribution (in the example shown in FIG. 5, driver A: low, driver B: high) and the parameters (the starting fare, the time unit price and the distance unit price) of the determined calculation formula for drivers A and B of taxi vehicles 100A and 100B of normal type that are present around boarding position P1. In the example shown in FIG. 5, driver information screen Sc2 further shows the discount (amount of discount) corresponding to the degree of DR contribution for the determined calculation formula.

Driver information screen Sc2 includes an operation section M31 corresponding to driver A, and an operation section M32 corresponding to driver B. When operation section M31 is operated, mobile terminal 500 requests server 300 to dispatch taxi vehicle 100A (driver A). When operation section M32 is operated, mobile terminal 500 requests server 300 to dispatch taxi vehicle 100B (driver B).

Operation section M22 is an operation section that enables user U to select a taxi vehicle of hire type (hereinafter, referred to as "hire vehicle"). Information section M22a shows a fare of the hire vehicle. However, when there is no vacant hire vehicle, operation section M22 and information section M22a are not shown. In the present embodiment, a fixed fare method, not the time and distance combined-use method described above, is used for the fare of the hire vehicle. The fare of the hire vehicle is, for example, fixed. However, the present disclosure is not limited to the foregoing. The fare of the hire vehicle may be variable in accordance with at least one of the approximate value of the occupied-state-traveling distance and the approximate value of the occupied-state-traveling time period shown on information section M20. When operation section M22 is operated, mobile terminal 500 requests server 300 to dispatch the hire vehicle.

Referring again to FIG. 4 together with FIGS. 1 and 2, in S23, with at least one of above-described vehicle selection screen Sc1 and driver information screen Sc2 being shown, mobile terminal 500 determines whether the taxi vehicle has been selected. In the present embodiment, when all of operation sections M31, M32 and M22 (FIG. 5) are not operated before a prescribed time period (hereinafter, denoted as "time period X") elapses since mobile terminal 500 received the taxi information signal (S14), a determination of NO is made in S23. When operation section M30 (FIG. 5) is operated, the determination of NO is also made in S23. When the determination of NO is made in S23, the series of steps S21 to S24 end. When operation section M30 (FIG. 5) is operated, the series of steps S21 to S24 are again started in response to an input of the boarding position on the boarding position input screen.

On the other hand, when any one of operation sections M31, M32 and M22 (FIG. 5) is operated before time period X elapses since mobile terminal 500 received the taxi information signal (S14), a determination of YES is made in S23 and the process proceeds to S24. In S24, mobile terminal 500 transmits a vehicle dispatch request signal corresponding to the selection (operation) by user U to server 300. For example, when operation section M31 is operated by user U, the vehicle dispatch request signal including the identification information of taxi vehicle 100A (FIG. 5) in addition to boarding position P1 and the destination (position P2) is transmitted to server 300. When operation section M32 is operated by user U, the vehicle dispatch request signal including the identification information of taxi vehicle 100B (FIG. 5) in addition to boarding position P1 and the destination (position P2) is transmitted to server 300. When operation section M22 is operated by user U, the vehicle dispatch request signal including hire designation information (information indicating that user U desires a hire type) in addition to boarding position P1 is transmitted to server 300.

After transmission of the taxi information signal in S14, server 300 determines whether server 300 has received the vehicle dispatch request from mobile terminal 500 (user U) in S15. In the present embodiment, when server 300 does not receive the vehicle dispatch request signal from mobile terminal 500 before the prescribed time period (more specifically, time period X described above) elapses since server 300 transmitted the above-described taxi information signal, a determination of NO is made in S15 and the process returns to the first step (S11).

On the other hand, when server 300 has received the vehicle dispatch request signal from mobile terminal 500 before time period X elapses since server 300 transmitted the above-described taxi information signal, a determination of YES is made in S15 and the process proceeds to S16. In S16, server 300 determines whether the vehicle dispatch request indicated by the vehicle dispatch request signal is directed to a taxi vehicle of normal type.

In the present embodiment, when the vehicle dispatch request signal includes the above-described hire designation information, a determination of NO is made in S16 and the process proceeds to S18. In S18, server 300 arranges a hire vehicle. Specifically, server 300 may request a taxi office nearest to boarding position P1 to dispatch the hire vehicle. The hire vehicle may travel toward boarding position P1 from the taxi office. When step S18 is performed, the process returns to the first step (S11). In the present embodiment, an evaluation of a driver is not made for the hire vehicle. However, the present disclosure is not limited to the foregoing. Similarly to the taxi vehicle of normal type, server 300 may also change the calculation formula of the taxi fare for the hire vehicle based on the result of evaluation of the degree of DR contribution by the driver.

When the vehicle dispatch request signal does not include the above-described hire designation information, a determination of YES is made in S16 and the process proceeds to S17. The determination of YES in S16 means that the vehicle dispatch request signal includes the identification information of the taxi vehicle of normal type. In S17, server 300 transmits a request signal to the taxi vehicle (e.g., taxi vehicle 100A or 100B shown in FIG. 5) identified by the identification information (vehicle ID) included in the vehicle dispatch request signal. The above-described request signal requests the above-described taxi vehicle to which the request signal is transmitted to travel toward boarding position P1 indicated by the vehicle dispatch request signal. In addition, the above-described request signal includes the calculation formula of the fare determined for the driver of the above-described taxi vehicle to which the request signal is transmitted (S13), and the destination (position P2). When step S17 is performed, the process returns to the first step (S11).

The calculation formula of the taxi fare according to the present embodiment is defined by the starting fare, the time unit price and the distance unit price. For example, when taxi vehicle 100A is specified by the vehicle dispatch request signal, the result of evaluation of the degree of DR contribution is low (C) for driver A, and thus, each of the starting fare, the time unit price and the distance unit price in the calculation formula of the fare is set at a value without discount (see FIG. 5). On the other hand, when taxi vehicle 100B is specified by the vehicle dispatch request signal, the result of evaluation of the degree of DR contribution is high (A) for driver B, and thus, each of the starting fare, the time unit price and the distance unit price in the calculation formula of the fare is set at a discounted value (see FIG. 5).

When taxi vehicle 100 (e.g., taxi vehicle 100A or 100B shown in FIG. 5) receives the above-described request signal (S17), ECU 50 of this taxi vehicle 100 starts a series of steps S31 to S36 described below. In S31, ECU 50 provides notification of the start of traveling in the occupied state to server 300. Next, ECU 50 controls fare meter 81 and indicator lamp 82 in S32, records occupied-state-traveling history data in storage device 53 in S33, and determines whether traveling in the occupied state by taxi vehicle 100 ends in S34. Until traveling in the occupied state ends (NO in S34), S32 to S34 are repeated.

Specifically, taxi vehicle 100 that has received the above-described request signal (S17) is driven by the driver and moves to boarding position P1 (FIG. 5). While taxi vehicle 100 is traveling toward boarding position P1, ECU 50 controls indicator lamp 82 such that indicator lamp 82 shows "Pickup" (S32). "Pickup" means that taxi vehicle 100 is traveling toward the boarding position specified by the user.

When taxi vehicle 100 arrives at boarding position P1, the driver takes user U (passenger) on taxi vehicle 100, and then, switches fare meter 81 to a state of being during metering (metering ON state). As a result, metering (fare addition) by fare meter 81 is started. While fare meter 81 is in the metering ON state, ECU 50 controls fare meter 81 such that the taxi fare calculated in accordance with the above-described calculation formula (request signal) from server 300 is shown on fare meter 81 (S32). Furthermore, ECU 50 controls indicator lamp 82 such that indicator lamp 82 shows "Occupied" (S32). "Occupied" means that taxi vehicle 100 is traveling in the occupied state. Simultaneously with the start of metering by fare meter 81, the driver of taxi vehicle 100 starts traveling in the occupied state toward the specified destination (position P2).

Taxi vehicle 100 that is traveling in the occupied state is driven by the driver and moves to the destination (position P2). During traveling in the occupied state, the occupied-state-traveling history data of taxi vehicle 100 is recorded in storage device 53 (S33). The occupied-state-traveling history data recorded in S33 includes an occupied-state-traveling time period (including the occupied-state-traveling start time and the occupied-state-traveling end time), and transition of the position of taxi vehicle 100 that is traveling in the occupied state (including a traveling route and a traveling distance). In the present embodiment, the timing at which fare meter 81 enters the metering ON state corresponds to the occupied-state-traveling start time, and the timing at which fare meter 81 enters a below-described metering OFF state corresponds to the occupied-state-traveling end time.

Figure 6:
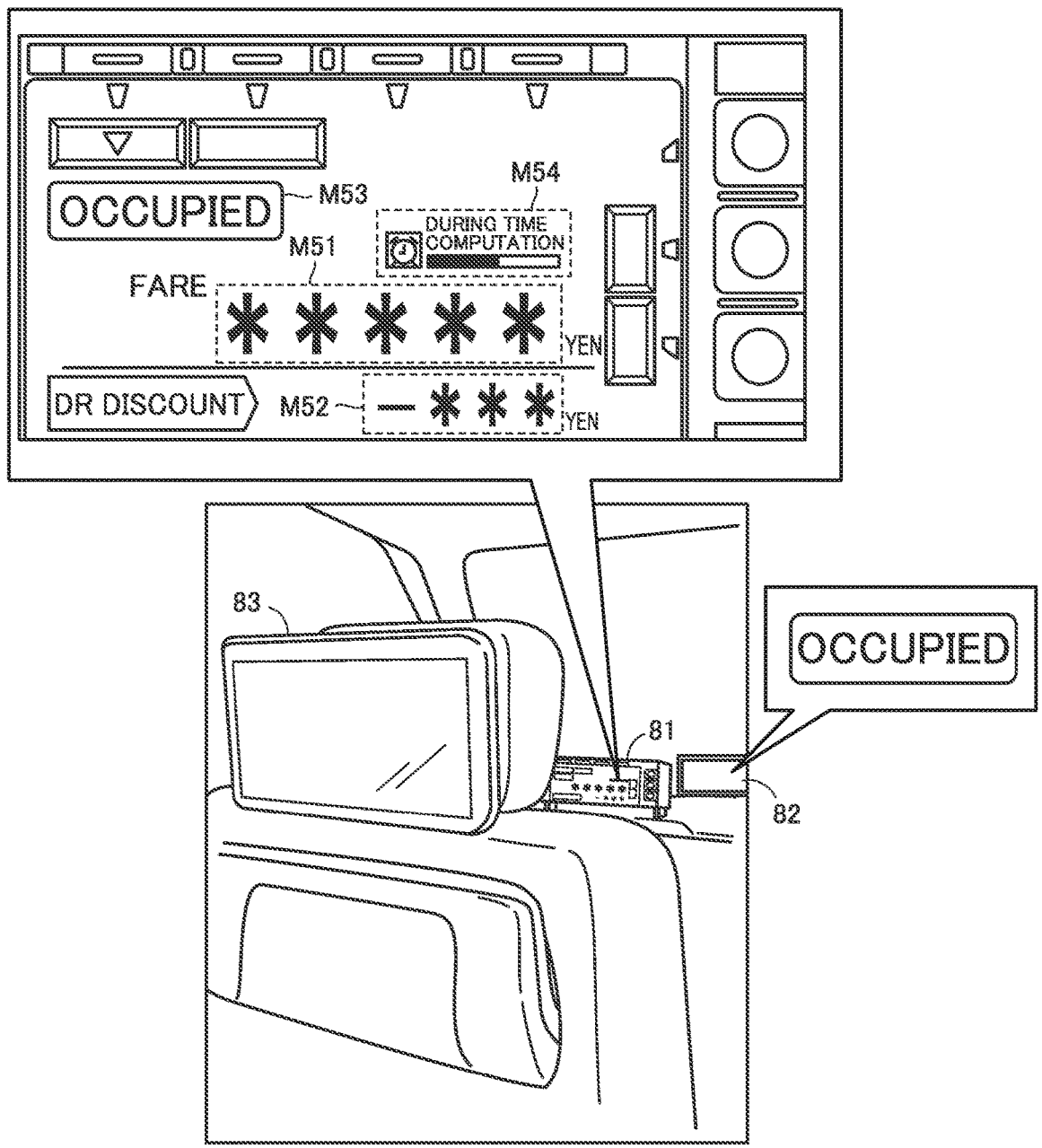
FIG. 6 shows an example of a state of a fare meter and an indicator lamp in the taxi vehicle that is in an occupied state in the taxi vehicle management method according to the embodiment of the present disclosure.

FIG. 6 shows an example of a state of fare meter 81 and indicator lamp 82 in taxi vehicle 100 that is traveling in the occupied state. In the example shown in FIG. 6, fare meter 81 shows an information section M51 that indicates the fare before discount (i.e., fare calculated in accordance with the calculation formula of the fare without discount), an information section M52 that indicates the amount of discount based on the result of evaluation of the degree of DR contribution by the driver, an information section M53 that indicates the state (occupied state) of taxi vehicle 100, and an information section M54 that indicates that taxi vehicle 100 is during low-speed traveling (i.e., fare addition is performed with the passage of time). In addition, in taxi vehicle 100 that is traveling in the occupied state, indicator lamp 82 shows "Occupied".

Referring again to FIG. 4 together with FIGS. 1 and 2, when taxi vehicle 100 arrives at the destination (position P2), the driver brings taxi vehicle 100 to a stop, and then, switches fare meter 81 to a metering stop state (metering OFF state). As a result, a determination of YES is made in S34 and the process proceeds to S35. When fare meter 81 enters the metering OFF state, metering (fare addition) by fare meter 81 stops and the fare is determined. Fare meter 81 continues to show the determined fare, until fare meter 81 receives a reset request.

In S35, ECU 50 transmits the occupied-state-traveling history data recorded in S33 to server 300. In addition, ECU 50 provides notification of the end of traveling in the occupied state to server 300. Thereafter, in S36, ECU 50 controls indicator lamp 82 such that indicator lamp 82 shows "Payment". "Payment" means that settlement of the fare (boarding fee) is being performed. In addition, ECU 50 causes HMI 83 placed in taxi vehicle 100 to show a screen for fare settlement by user U (hereinafter, referred to as "settlement screen").

Figure 7:
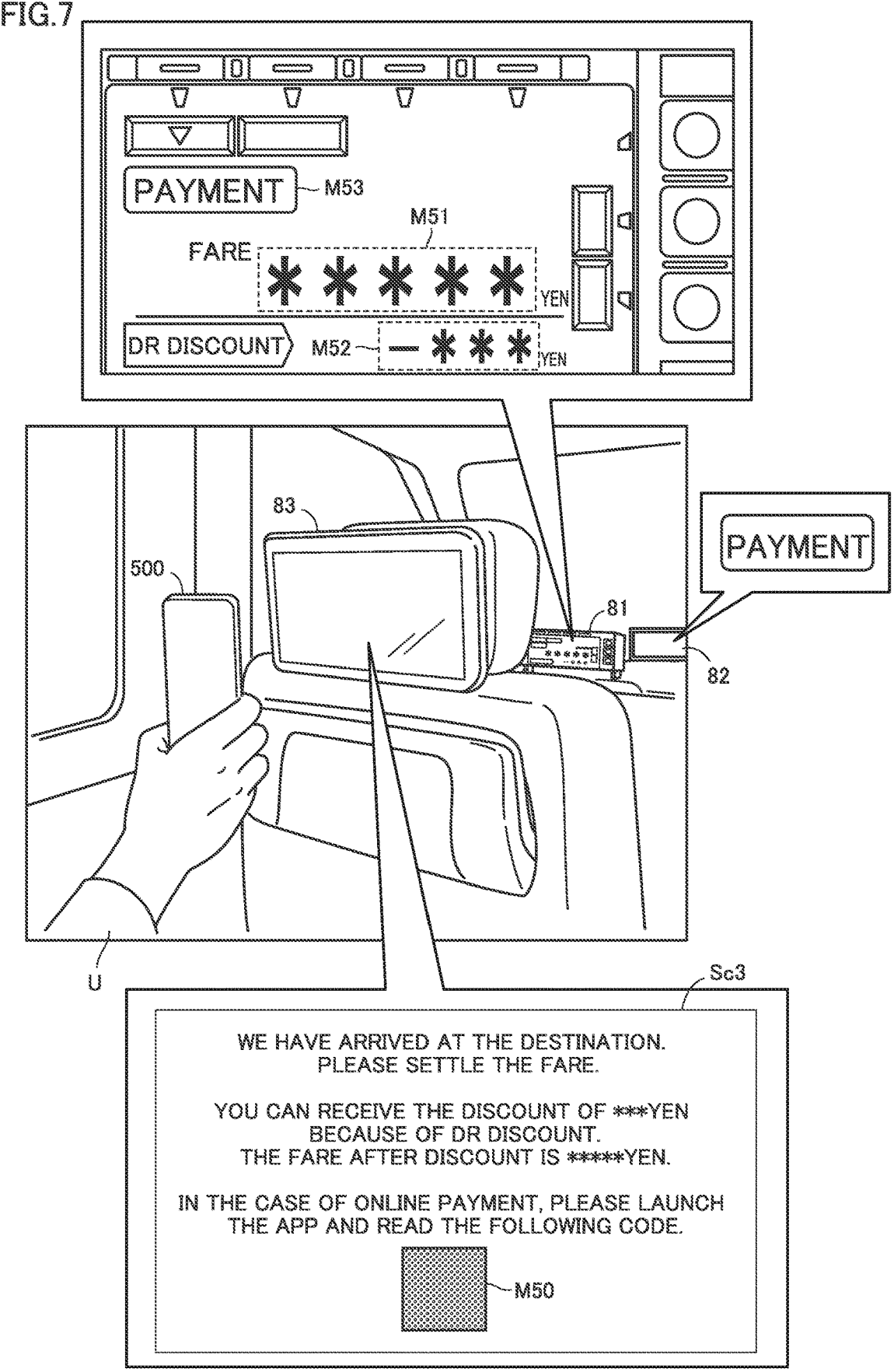
FIG. 7 shows an example of a state of the taxi vehicle that is in a fare settlement state in the taxi vehicle management method according to the embodiment of the present disclosure.

FIG. 7 shows an example of a state of taxi vehicle 100 that is in the fare settlement state. Referring to FIG. 7, fare meter 81 causes, for example, information sections M51 and M52 to show the determined fare (the fare before discount and the amount of discount corresponding to the degree of DR contribution). In taxi vehicle 100 that is in the fare settlement state, indicator lamp 82 shows "Payment" and the state (payment) of taxi vehicle 100 is also shown on information section M53 of fare meter 81. In addition, ECU 50 causes, for example, the tablet terminal (HMI 83) placed on the front seat to show a settlement screen Sc3. The tablet terminal shows settlement screen Sc3 for user U sitting in the rear seat.

Settlement screen Sc3 shows the fare charged to user U (i.e., fare after discount), and the amount of discount based on the result of evaluation of the degree of DR contribution by the driver. Settlement screen Sc3 further shows a code M50 for online payment. Code M50 includes fare information. When user U reads code M50 by using the camera of mobile terminal 500 that has launched the vehicle dispatch app, the identification information (terminal ID) of mobile terminal 500 that has read code M50 and the fare (amount charged) of the current traveling in the occupied state are transmitted to server 300 by the vehicle dispatch app. As a result, online payment of the fare (and in turn fare settlement) is completed. For example, the fare (amount charged) is withdrawn from a bank account of user U on the prescribed withdrawal date. However, user U may pay the fare to the driver in cash, not through online payment.

When the fare settlement ends, step S36 in FIG. 4 ends. When step S36 ends, the series of steps S31 to S36 end. When the fare settlement ends in taxi vehicle 100, the indication on indicator lamp 82 is switched from "Payment" to "Vacant-DR Completed" or "Vacant-DR Uncompleted".

The discount of the fare based on the degree of DR contribution may be compensated by a profit earned by demand response (DR), i.e., an incentive received from the TSO or a profit earned by buying and selling in the power market.

The vehicle dispatch manager (aggregator) may receive the profit earned by DR. The vehicle dispatch manager may pay a salary corresponding to business performance to the driver of each taxi vehicle managed by the vehicle dispatch manager. For example, server 300 may calculate the salary of each taxi driver in accordance with a calculation formula that is common to all taxi drivers, regardless of the degree of DR contribution by each taxi driver. Server 300 may evaluate the business performance of each taxi driver based on the occupied-state-traveling history data (S33, S35), not the sales produced by traveling in the occupied state (passenger transport). For example, server 300 may evaluate the business performance of each taxi driver by using at least one of the occupied-state-traveling distance and the occupied-state-traveling time period.

Alternatively, the taxi driver may receive the profit earned by DR (e.g., profit corresponding to the DR actual value). The taxi driver may receive the sales produced by traveling in the occupied state (passenger transport) and the profit earned by DR as his own income, and pay a management fee to the vehicle dispatch manager (aggregator).

As described above, the taxi vehicle management method according to the present embodiment includes the processes shown in FIGS. 3 and 4. Server 300 includes processor 310, and storage device 330 having stored thereon a program that causes processor 310 to perform steps S111 to S114 in FIG. 3 and steps S11 to S18 in FIG. 4.

When server 300 transmits the DR request signal in S112, server 300 obtains the DR contribution history information (S126 in FIG. 3) from the taxi vehicle that has participated in demand response (DR) for energy management, the DR contribution history information indicating a history of contribution to the DR by the driver of the taxi vehicle. The taxi vehicle contributes to the DR by using the power storage device (battery 11) of the taxi vehicle.

Furthermore, in S12 in FIG. 4, server 300 evaluates the degree of DR contribution by the driver, using the above-described DR contribution history information of the driver. In S13 in FIG. 4, server 300 determines the calculation formula of the fare of the taxi vehicle driven by the driver, using the result of evaluation of the degree of DR contribution by the driver. In S13 in FIG. 4, server 300 determines the calculation formula of the fare such that the fare becomes lower as the degree of DR contribution by the driver becomes higher. According to the processes shown in FIGS. 3 and 4, it is possible to suppress a decrease in business performance of the taxi driver participating in the DR, while promoting participation in the DR by the taxi driver. The lighting color of indicator lamp 82 (super sign) in the vacant taxi vehicle may be changed depending on the result of evaluation of the degree of DR contribution (e.g., high/normal/low) by the driver. The user may directly request the vacant taxi vehicle to carry out passenger transport, without using the vehicle dispatch app.

The taxi vehicle management system according to the present embodiment includes server 300 (computer device), the plurality of taxi vehicles (group of vehicles 1), and mobile terminal 500 (user terminal) used by the user of the taxi vehicle. Each of the plurality of taxi vehicles includes the power storage device (battery 11), and fare meter 81 that shows the fare of the taxi vehicle. Server 300 performs steps S111 to S114 in FIG. 3 and steps S11 to S18 in FIG. 4 for each of the plurality of taxi vehicles. Mobile terminal 500 shows the selection screen on which the user selects the taxi vehicle to use from the candidate taxi vehicles (S22 in FIG. 4). The selection screen shows the fare information of each taxi vehicle included in the candidate taxi vehicles (see FIG. 5). Mobile terminal 500 obtains, from server 300, the fare information about the calculation formula of the fare determined for the driver of each taxi vehicle included in the candidate taxi vehicles (S21 in FIG. 4). Mobile terminal 500 transmits, to server 300, the vehicle dispatch request signal including the identification information of the taxi vehicle selected by the user on the selection screen and the boarding position of the user (S24 in FIG. 4). When server 300 receives the vehicle dispatch request signal, server 300 transmits the request signal to the taxi vehicle identified by the identification information, the request signal being a signal that requests traveling toward the boarding position indicated by the vehicle dispatch request signal (S17 in FIG. 4). The request signal includes the calculation formula of the fare determined for the driver of the taxi vehicle identified by the identification information. In response to the above-described request signal, server 300 causes the taxi vehicle to calculate the fare in accordance with the determined calculation formula of the fare. When each of the plurality of taxi vehicles receives the request signal, each of the plurality of taxi vehicles causes fare meter 81 to show the fare calculated in accordance with the calculation formula of the fare included in the request signal (S32 in FIG. 4).

In the above-described system, the degree of DR contribution by the driver and the fare of the taxi vehicle are associated with each other, and thus, a taxi vehicle driven by a driver having a higher degree of contribution to DR is more likely to be selected by the user. Furthermore, according to the above-described system, the user can specify the taxi vehicle and the boarding position through the user terminal and request server 300 to dispatch the taxi vehicle. Then, server 300 that has received the request for vehicle dispatch can request the target vehicle (specified taxi vehicle) to travel toward the specified boarding position. Furthermore, according to the above-described system, the calculation formula of the fare is determined based on the degree of DR contribution by the driver of the taxi vehicle. In the taxi vehicle, the fare calculated in accordance with the calculation formula is shown on fare meter 81. This facilitates the business of the taxi vehicles under a fair rule.

In the above-described embodiment, server 300 performs steps S12 to S14 in FIG. 4 on all vacant taxi vehicles that are present around the boarding position specified by user U. However, the present disclosure is not limited to the foregoing. Server 300 may perform steps S12 to S14 in FIG. 4 on only a taxi vehicle that has participated in the DR (taxi vehicle that has already participated in the DR in the current evaluation time period), of the vacant taxi vehicles that are present around the boarding position specified by user U.

In the above-described embodiment, the on-premise server (server 300) functions as an example of "computer device" according to the present disclosure. However, the present disclosure is not limited to the foregoing. The function of server 300 (particularly, function related to taxi vehicle management) may be implemented on a cloud by cloud computing.

Power grid PG (external power supply) is not limited to a large-scale AC grid, and may be a microgrid or may be a direct current (DC) grid. The number of taxi vehicles included in the group of vehicles 1 is arbitrary, and may be equal to or more than 3 and less than 30, or may be equal to or more than 30 and less than 100, or may be equal to or more than 100. The number of EVSEs included in the group of EVSEs 2 is also arbitrary. The group of EVSEs 2 may include at least one of a normal charger and a quick charger. The group of EVSEs 2 may include a public EVSE (e.g., EVSE placed in a commercial facility, an automobile retailer, or a parking area of a highway). The EVSE may be placed in a taxi stop.

One taxi vehicle may be shared by a plurality of drivers. In such a configuration, the vehicle information stored in server 300 may include identification information (driver ID) of a current driver of the taxi vehicle. A personally owned vehicle (POV) may be used as the taxi vehicle. Server 300 may be configured to dispatch a registered POV. The group of EVSEs 2 may include an EVSE placed at home of a POV's driver.

The configuration of the taxi vehicle is not limited to the configuration shown in FIG. 2, and can be changed as appropriate. For example, only one of inlet 60 (port for EVSE 200A) and power transmission and reception circuit 70 (port for EVSE 200B), not both of inlet 60 and power transmission and reception circuit 70, may be mounted on the taxi vehicle. Instead of charger/discharger 61, a charging circuit capable of only external charging (charging of battery 11 by using electric power supplied from outside the taxi vehicle), or a power feeding circuit capable of only external power feeding (power feeding to the outside of the taxi vehicle by using electric power of battery 11) may be used.

Although the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle management system comprising:
a display controller;
a plurality of vehicles; and
a user terminal, wherein
the user terminal includes a first display apparatus,
each of the plurality of vehicles includes a power storage device, a position sensor, a second display apparatus, and a third display apparatus,
the second display apparatus is configured to show a state of the vehicle so as to be visible from outside of the vehicle,
the third display apparatus is configured to show information of the vehicle towards the inside of the vehicle,
the display controller is configured to
request a first target vehicle selected from among the plurality of vehicles to perform energy management of a power grid,
control the second display apparatus of the first target vehicle to show that the first target vehicle is in an energy management state while energy management of the power grid by the power storage device in the first target vehicle is being performed, and
control, when the first target vehicle finishes energy management of the power grid, the second display apparatus of the first target vehicle to show that the first target vehicle is in a vacant state and the first target vehicle has already participated in energy management of the power grid,
each of the plurality of vehicles is configured to
in response to a request from the display controller, perform energy management of the power grid by at least one of charging or discharging the power storage device with the power storage device and the power grid being electrically connected,
record history data on energy management of the power grid while the energy management of the power grid is being performed, and
transmit the history data to the display controller when the energy management of the power grid ends,
the display controller is further configured to evaluate a degree of contribution to energy management of the power grid by a driver of each of the plurality of vehicles based on the history data of each of the plurality of vehicles,
each of the plurality of vehicles is further configured to sequentially transmit a position of the vehicle to the display controller by wireless communication,
the display controller is further configured to
in response to a request from the user terminal, select a plurality of second target vehicles from among the plurality of vehicles, and
control the first display apparatus to show a selection screen indicating a position of each of the plurality of second target vehicles and a result of the evaluation of the degree of contribution to energy management of the power grid by a driver of each of the plurality of second target vehicles,
the user terminal is configured to, in response to a user selecting any one of the plurality of second target vehicles on the selection screen shown on the first display apparatus, transmit identification information of the selected second target vehicle, and
the display controller is further configured to control the third display apparatus of the selected second target vehicle based on the result of the evaluation of the degree of contribution to energy management of the power grid by the driver of the selected second target vehicle upon receiving the identification information of the selected second target vehicle.

2. The vehicle management system according to claim 1, wherein
the display controller is further configured to control the second display apparatus to change lighting color of the second display apparatus in accordance with a result of the evaluation of the degree of contribution to energy management of the power grid by a driver of each of the plurality of vehicles.

3. The vehicle management system according to claim 1, wherein
the history data indicates an actual value, a participation time period, and a number of times of participation, the actual value indicating an amount of power of charging or discharging of the power storage device for energy management of the power grid performed by any one of the plurality of vehicles, the participation time period indicating a time period of energy management of the power grid performed by any one of the plurality of vehicles, and the number of times of participation indicating the number of times of participation in energy management of the power grid by any one of the plurality of vehicles,
the display controller is configured to evaluate, for a driver of any one of the plurality of vehicles, that the degree of contribution to energy management of the power grid becomes higher as a total value of the actual value in an evaluation time period becomes larger, a total value of the participation time period in the evaluation time period becomes longer, and a total value of the number of times of participation in the evaluation time period becomes larger.

4. The vehicle management system according to claim 3, wherein
the display controller is configured to
evaluate, as being high, the degree of contribution to energy management of the power grid by a driver of any one of the plurality of vehicles in which a first evaluation value is equal to or larger than a first reference value, a second evaluation value is equal to or larger than a second reference value, and a third evaluation value is equal to or larger than a third reference value, and
evaluate, as being low, the degree of contribution to the energy management of the power grid by a driver of any one of the plurality of vehicles in which the first evaluation value is less than the first reference value, the second evaluation value is less than the second reference value, and the third evaluation value is less than the third reference value,
the first evaluation value is the total value of the actual value in the evaluation time period, the second evaluation value is the total value of the participation time period in the evaluation time period, and the third evaluation value is the total value of the number of times of participation in the evaluation time period.

5. The vehicle management system according to claim 3, wherein
the display controller is configured to vary the start time and the end time of the evaluation time period for each driver of the plurality of vehicles.

6. The vehicle management system according to claim 1, wherein
each of the plurality of vehicles is configured to
provide a start notification to the display controller at the start of energy management of the power grid,
provide an end notification to the display controller at the end of energy management of the power grid,
the display controller is configured to
determine whether each of the plurality of vehicles is in an energy management state based on the first start notification and the end notification, the energy management state being a state of participating in the energy management of the power grid.

7. The vehicle management system according to claim 1, wherein
the user terminal is a smartphone including a touch panel display,
the first display apparatus is the touch panel display,
each of the plurality of vehicles is a taxi vehicle,
the second display apparatus is an indicator lamp, and
the third display apparatus is a fare meter.

8. The vehicle management system according to claim 1, further comprising a server that belongs to a transmission system operator of the power grid, wherein
the display controller is configured to
select the first target vehicle from among the plurality of vehicles in response to a request from the server, and
request the selected first target vehicle to perform energy management of the power grid.

9. The vehicle management system according to claim 1, wherein
each of the plurality of vehicles further includes a first power transmission and reception circuit, a charger/discharger, and an electronic control unit (ECU),
each of the plurality of vehicles is configured to
charge the power storage device by using electric power supplied from the power grid through a first electric vehicle supply equipment (EVSE) to the charger/discharger, and
supply electric power discharged from the power storage device to the power grid through the charger/discharger and the first EVSE,
the first EVSE is a wireless-type power feeding facility including a second power transmission and reception circuit placed on a road,
the first power transmission and reception circuit is configured to wirelessly exchange electric power with the second power transmission and reception circuit,
the charger/discharger includes a bidirectional converter configured to perform direct current/alternating current conversion bidirectionally,
each of the plurality of vehicles has a function of self-driving, and
the ECU is configured to
perform, by using the function of self-driving to a target position, alignment of the first power transmission and reception circuit such that the first power transmission and reception circuit is located directly above the second power transmission and reception circuit,
after the alignment between the first power transmission and reception circuit and the second power transmission and reception circuit is completed, control the charger/discharger and the first power transmission and reception circuit to charge the power storage device by using electric power supplied from the second power transmission and reception circuit through the first power transmission and reception circuit to the charger/discharger, or supply electric power discharged from the power storage device to the second power transmission and reception circuit through the charger/discharger and the first power transmission and reception circuit.

10. The vehicle management system according to claim 9, wherein
each of the plurality of vehicles further includes an inlet,
each of the plurality of vehicles is configured to
charge the power storage device by using electric power supplied from the power grid through a second EVSE to the charger/discharger, and
supply electric power discharged from the power storage device to the power grid through the charger/discharger and the second EVSE,
the second EVSE is a wired-type power feeding facility including a power cable,
the inlet is configured to be connectable to the power cable, and
the ECU is configured to, with the inlet and the power cable being electrically connected, control the charger/discharger to charge the power storage device by using electric power supplied from the second EVSE through the inlet to the charger/discharger, or supply electric power discharged from the power storage device to the second EVSE through the charger/discharger and the inlet.

11. The vehicle management system according to claim 10, wherein
each of the plurality of vehicles further includes a charging/discharging relay, a system main relay (SMR), a motor generator, a power control unit (PCU), a monitoring module, and driving wheels,
the charger/discharger and the charging/discharging relay are located between the inlet and the power storage device and between the first power transmission and reception circuit and the power storage device,
the charging/discharging relay is configured to perform switching between connection and disconnection of a power line extending from each of the inlet and the first power transmission and reception circuit to the power storage device,
the PCU includes a circuit configured to drive the motor generator by using electric power supplied from the power storage device,
the motor generator is configured to be driven by the PCU and rotate the driving wheels,
each of the plurality of vehicles has a charging/discharging line including the charger/discharger and the charging/discharging relay,
the charging/discharging line is connected between the SMR and the PCU, the monitoring module is configured to detect a state of the charger/discharger, the state of the charger/discharger including charging power and discharging power, and the ECU is configured to
in response to a request from the display controller, control the charger/discharger to perform energy management of the power grid by at least one of charging or discharging the power storage device with the power storage device and the first EVSE or the second EVSE being electrically connected, maintain the SMR and the charging/discharging relay in a connected state while the energy management of the power grid is being performed, control the charger/discharger such that charging power or discharging power detected by the monitoring module becomes closer to a target value, and record the charging power or the discharging power as the history data while the energy management of the power grid is being performed.

12. A display controller configured to control a first display apparatus and a second display apparatus, wherein
the first display apparatus is mounted on a user terminal,
the second display apparatus is mounted on a vehicle, the vehicle including a power storage device,
the second display apparatus is configured to show a state of the vehicle so as to be visible from outside of the vehicle, and the display controller is configured to
control the second display apparatus to show that the vehicle is in an energy management state while energy management of a power grid by the power storage device is being performed, control, when the vehicle finishes energy management of the power grid, the second display apparatus to show that the vehicle is in a vacant state and the vehicle has already participated in energy management of the power grid, obtain history data on energy management of the power grid by the power storage device from the vehicle, evaluate a degree of contribution to energy management of the power grid by a driver of the vehicle based on the history data, and control the first display apparatus to show a result of evaluation of the degree of contribution to energy management of the power grid by the driver.

13. The display controller according to claim 12, wherein the display controller is configured to control a third display apparatus based on the result of evaluation of the degree of contribution to energy management of the power grid by the driver, the third display apparatus being configured to show information of the vehicle towards inside of the vehicle.

* * * * *